US009437381B2

(12) United States Patent
Hassan-Ali et al.

(10) Patent No.: US 9,437,381 B2
(45) Date of Patent: Sep. 6, 2016

(54) ELECTRIC VEHICLE SUPPORT EQUIPMENT HAVING A SMART PLUG WITH A RELAY CONTROL CIRCUIT

(71) Applicant: Tyco Electronics Corporation, Berwyn, PA (US)

(72) Inventors: Mudhafar Hassan-Ali, Petaluma, CA (US); Jason Larson, San Lorenzo, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 43 days.

(21) Appl. No.: 13/829,531

(22) Filed: Mar. 14, 2013

(65) Prior Publication Data

US 2014/0268473 A1  Sep. 18, 2014

(51) Int. Cl.
*H01H 47/02* (2006.01)
*H01H 47/22* (2006.01)
(Continued)

(52) U.S. Cl.
CPC ............. *H01H 47/02* (2013.01); *B60L 3/0046* (2013.01); *B60L 3/04* (2013.01); *B60L 11/1818* (2013.01); *B60L 11/1846* (2013.01); *H01H 47/04* (2013.01); *H01H 47/10* (2013.01); *H01H 47/22* (2013.01); *B60L 2230/12* (2013.01); *B60L 2240/36* (2013.01); *B60L 2240/527* (2013.01); *B60L 2240/529* (2013.01); *B60L 2270/20* (2013.01); *H01H 9/56* (2013.01); *H01H 83/20* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ...... B60L 3/0046; B60L 3/0069; B60L 3/04; H01H 47/10
USPC .......................................... 361/42, 93.1, 160
See application file for complete search history.

(56) References Cited

U.S. PATENT DOCUMENTS 4,680,490 A    7/1987   Baker et al.
4,924,483 A *   5/1990   Cho .................................. 377/3
(Continued)

FOREIGN PATENT DOCUMENTS

DE     42 31 242 A1    3/1994
DE     198 08 229 A1    9/1999
(Continued)

OTHER PUBLICATIONS

International Search Report, International Application No. PCT/US2014/020959, International Filing Date, Mar. 6, 2014.

*Primary Examiner* — Stephen W Jackson
*Assistant Examiner* — Christopher Clark (57) ABSTRACT

A smart plug for coupling an electric vehicle to a power supply includes a relay including contacts, the relay configured to operate in a closed state to enable power to be supplied to the electric vehicle and an open state to prohibit power from being supplied to the electric vehicle. The smart plug also includes a microcontroller (MCU) coupled to the relay, the microcontroller outputting a control signal to operate the relay in the closed state. The smart plug further includes a zero crossing detector (ZCD) coupled to the relay, the ZCD outputting a close signal to the relay when a voltage of the power is substantially zero and outputting an open signal to the relay when a current of the power is substantially zero.

18 Claims, 4 Drawing Sheets

(51) Int. Cl.
  *H01H 47/10* (2006.01)
  *B60L 11/18* (2006.01)
  *B60L 3/00* (2006.01)
  *H01H 47/04* (2006.01)
  *B60L 3/04* (2006.01)
  *H01H 9/56* (2006.01)
  *H01H 83/20* (2006.01)

(56) References Cited

U.S. PATENT DOCUMENTS

| | | | |
|---|---|---|---|
| 5,179,490 A * | 1/1993 | Lawrence | 361/42 |
| 5,361,184 A | 11/1994 | El-Sharkawi et al. | |
| 5,821,642 A * | 10/1998 | Nishhira et al. | 307/127 |
| 6,963,186 B2 * | 11/2005 | Hobbs | 320/128 |
| 7,330,342 B2 | 2/2008 | Bald et al. | |
| 8,335,062 B2 * | 12/2012 | Haines et al. | 361/42 |
| 8,421,473 B2 * | 4/2013 | Shea | 324/536 |
| 8,831,077 B2 * | 9/2014 | Varadarajan et al. | 375/222 |
| 2005/0135040 A1 * | 6/2005 | Suzuki | H01H 47/04 361/160 |
| 2006/0139839 A1 * | 6/2006 | Sato et al. | 361/140 |
| 2011/0169447 A1 * | 7/2011 | Brown et al. | 320/109 |
| 2011/0202192 A1 | 8/2011 | Kempton | |
| 2011/0216453 A1 * | 9/2011 | Haines et al. | 361/49 |
| 2012/0002714 A1 | 1/2012 | Varadarajan et al. | |
| 2012/0206100 A1 * | 8/2012 | Brown et al. | 320/109 |
| 2014/0015487 A1 * | 1/2014 | Brown et al. | 320/109 |

FOREIGN PATENT DOCUMENTS

| | | |
|---|---|---|
| EP | 2196353 A1 | 6/2010 |
| EP | 2559588 A1 | 2/2013 |
| EP | 2733815 A1 | 5/2014 |
| EP | 2733860 A1 | 5/2014 |
| EP | 2733861 A1 | 5/2014 |
| WO | 2013008429 A1 | 1/2013 |
| WO | 2013008921 A1 | 1/2013 |
| WO | 2013008922 A1 | 1/2013 |

* cited by examiner

ELECTRIC VEHICLE SUPPORT EQUIPMENT HAVING A SMART PLUG WITH A RELAY CONTROL CIRCUIT

BACKGROUND OF THE INVENTION

The subject matter herein relates generally to electric vehicle support equipment having a smart plug with a control circuit for operating a relay.

Relays are used in different types of applications. One application is an automotive application for connecting an electrical vehicle to an external power source. In operation, the relay is activated to enable a charging current to be delivered to the electrical vehicle. The relay is then deactivated to prevent the charging current from being delivered to the electrical vehicle.

In circuits that convey relatively high levels of current, such as the circuits utilized to charge electric vehicles, electric arcs may be generated inside the relay when the contacts within the relay are repositioned from the deactivated state, referred to herein as breaking the contacts, to the activated state, referred to herein as making the contacts. Because the relay is an electromechanical device, the relay exhibits mechanical behavior during operation. Thus, when the relay is activated, the contacts may temporarily bounce or chatter before the contacts are in the final position, i.e. a make position. While the distance between the contacts during a chatter event may be less than ten micrometers, the residual voltage within the relay creates a relatively large electrical field that results in the arc.

The electric arc may be of relatively high energy. If the arc is of sufficiently high energy, the arc may damage and/or contaminate the contacts in the relay. Moreover, in some instances the arc may cause sufficient heat to be generated to weld the contacts together. For example, the arc may weld the contacts together such that the contacts cannot be separated to open the circuit to which the relay is connected. Mechanical dampening devices may be utilized to reduce the chatter. However, the mechanical dampening devices may not fully eliminate the chatter.

A need remains for a smart plug having a relay control circuit that is operable to activate and deactivate a relay controlling relatively large electric currents while reducing excessive arcing that may cause damage to the contacts in the relay. A need remains for a relay control circuit that provides protection from fault conditions.

BRIEF DESCRIPTION OF THE INVENTION

In one embodiment, a smart plug for coupling an electric vehicle to a power supply is provided. The smart plug includes a relay including contacts, the relay configured to operate in a closed state to enable power to be supplied to the electric vehicle and an open state to prohibit power from being supplied to the electric vehicle. The smart plug also includes a microcontroller (MCU) coupled to the relay, the microcontroller outputting a control signal to operate the relay in the closed state. The smart plug further includes a zero crossing detector (ZCD) coupled to the relay, the ZCD outputting a close signal to the relay when a voltage of the power is substantially zero and outputting an open signal to the relay when a current of the power is substantially zero.

In another embodiment, an electric vehicle support equipment (EVSE) system is provided. The EVSE includes a nozzle configured to couple to an electric vehicle, a smart plug, and a cable coupled between the nozzle and the smart plug. The smart plug includes a relay including contacts. The relay is configured to operate in a closed state to enable power to be supplied to the electric vehicle and an open state to prohibit power from being supplied to the electric vehicle. The EVSE also includes a microcontroller (MCU) coupled to the relay, the microcontroller outputting a control signal to operate the relay in the closed state. The EVSE further includes a zero crossing detector (ZCD) coupled to the relay, the ZCD outputting a close signal to the relay when a voltage of the power is substantially zero and outputting an open signal to the relay when a current of the power is substantially zero.

In a further embodiment, a relay control circuit for making or breaking contacts is provided. The relay control circuit includes a current zero crossing detector (ZCD), and a relay coupled to the ZCD. The relay includes contacts configured to operate in a closed state to enable power to be supplied to an electric vehicle and an open state. The relay also includes a coil driver coupled to the contacts. In operation, the ZCD outputs a close signal to the coil driver when a voltage of a power signal is substantially zero and outputs an open signal to the coil driver when a current of the power is substantially zero.

DETAILED DESCRIPTION OF THE INVENTION

Figure 1:
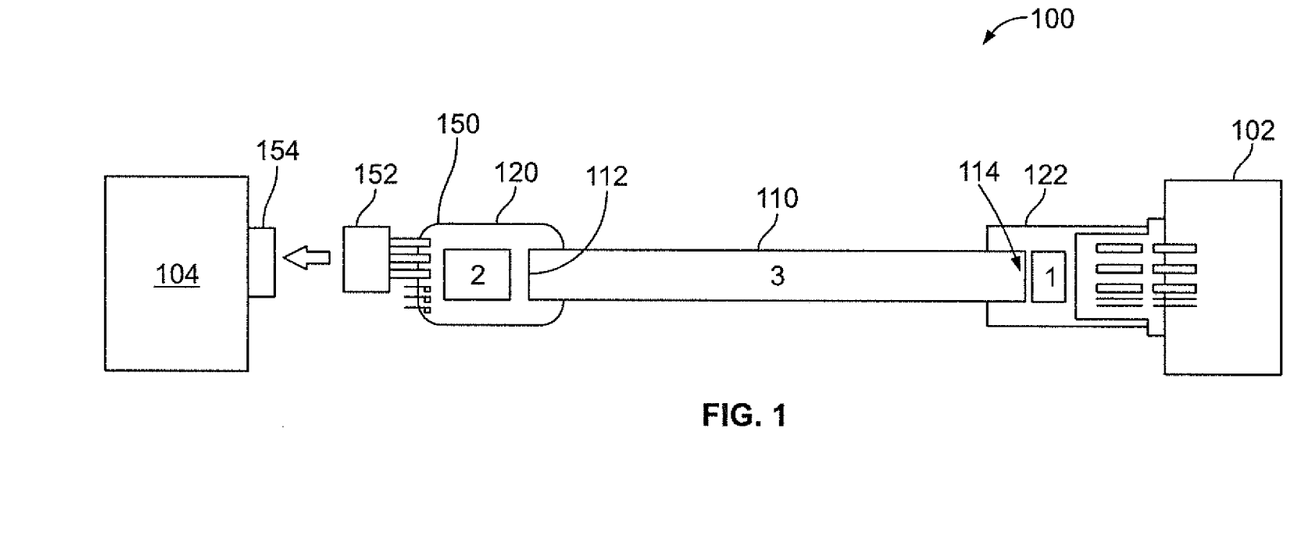
FIG. 1 illustrates electric vehicle supply equipment (EVSE) system formed in accordance with an exemplary embodiment. (of the EVSE system)

FIG. 1 illustrates electric vehicle supply equipment (EVSE) system 100 formed in accordance with an exemplary embodiment. The EVSE system 100 is configured to enable an electric vehicle 102 to be coupled to, or uncoupled from, a power supply 104. In operation, the EVSE system 100 enables the electric vehicle 102 to be charged via power received from the power supply 104 when in the coupled configuration and to be electrically uncoupled from the power supply 104 in the uncoupled configuration.

The EVSE system 100 generally includes a cable 110 having a first end 112 and an opposing second end 114. The EVSE system 100 further includes a smart plug 120 that is coupled to the cable first end 112 and a nozzle 122 that is coupled to the cable second end 114.

The smart plug 120 may be embodied as a charging circuit interrupt device (CCID) 150 that is configured to connect the electric vehicle 102 to the power supply 104. In operation, the CCID 150 controls the current being transmitted from the power supply 104 to the electric vehicle 102 and thus controls the charging of the electric vehicle 102. In the exemplary embodiment, The smart plug 120 also includes a connector 152 that enables the smart plug 120, and thus the electric vehicle 102, to be plugged into a standard AC power outlet 154 utilized in North America. The connector 152 is therefore configured to satisfy the criteria established by the National Electrical Manufacturer's Association (NEMA). For example, in one embodiment, the connector 152 is a (NEMA-5) plug. The smart plug 120 may be configured for connection to other types of systems, such as those used in other countries and that comply with other standards.

In another embodiment, the smart plug 120 is configured as an In-Cable Charging Device (ICCD) (not shown) to enable the smart plug 120 to be plugged into a European style power outlet. In this case, the connector 152 may be configured as a pigtail wherein the charger is integrated with the cable 110. The pigtail may have a temperature sensor associated therewith.

Figure 2:
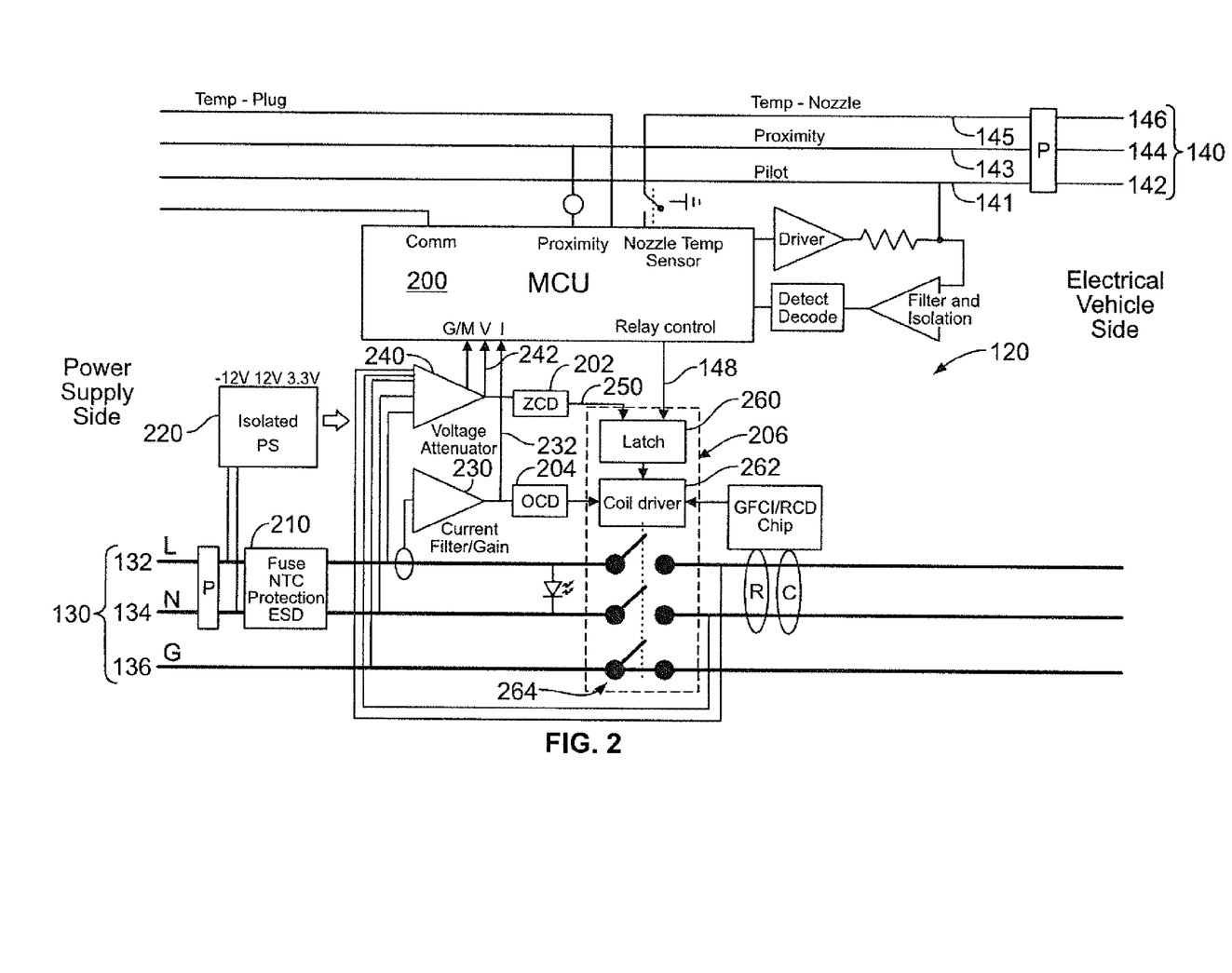
FIG. 2 is a schematic illustration of a smart plug formed in accordance with an exemplary embodiment of the EVSE system shown in FIG. 1.

With additional reference to FIG. 2, FIG. 2 is a schematic illustration of the smart plug 120. The cable 110 includes a plurality of conductors 130 (shown in FIG. 2). For example, the cable 110 may include a power conductor 132, a neutral conductor 134, and a ground 136. In various embodiments, the conductors 130 are size fourteen American Wire Gauge (AWG 14) conductors that enable the cable 110 to supply up to sixteen amps (A) at a voltage of 110V and/or 220V to the electric vehicle 102. It should be realized that the cable 110 may include more than three conductors 130. Moreover, it should be realized that the wire sizes of the individual conductors 130 may be larger than 14 AWG. The cable 110 may also include various communication lines 140 (shown in FIG. 2) for transmitting information between the smart plug 120 and the nozzle 122 and/or electric vehicle 102. The communication lines 140 may include for example, a communication line for transmitting a pilot signal 142, a communication line for transmitting a proximity detection signal 144, and/or a communication line for transmitting a nozzle temperature signal 146. The communication lines 140 may be for example, size AWG 20 to enable the pilot signal 142, the proximity detection signal 144, and the temperature signal 146 to be transmitted from the electric vehicle 102 to the smart plug 120 and or transmitted from the smart plug 120 and received by the electric vehicle 102.

In operation, the proximity detection signal 144 is utilized to determine when the nozzle 122 is plugged into the electric vehicle 102. More specifically, when the nozzle 122 is initially coupled to the electric vehicle 102, the proximity detection signal 144 is generated. The smart plug 120 generates the pilot signal 142 and, when the electric vehicle 102 is ready for charging, the pilot signal 142 indicates such status to the smart plug 120 to initiate a charging operation. The pilot signal 142 also indicates a maximum current that may be supplied from the power supply 104 to the electric vehicle 102 during the charging operation. In various embodiments, a microcontroller unit (MCU) 200 determines that the nozzle 122 is plugged into the electric vehicle 102 and is ready to initiate the charging operation based on the inputs received from the pilot signal 142 and the proximity detection signal 144. More specifically, the MCU 200 outputs a relay control signal 148 to a relay 206 (shown in FIG. 2) when the inputs are received from the pilot signal 142 and the proximity detection signal 144. In an exemplary embodiment, the smart plug 120 uses the relay 206 to initiate switching operations, however other types of switching devices may be used in alternative embodiments. The switching device may more generally be referred to as a switch 206.

The temperature may be sensed at two locations. The two locations may include for example, a temperature inside the MCU 200 that may be sensed using an internal temperature sensor embedded in the MCU 200. Moreover, a temperature of the nozzle 122 may be sensed using the temperature sensor 146 that is embedded in the nozzle 122. The temperature of other components of the system at other locations may be sensed and used to control operation. In operation, a maximum charging current delivered to the electric vehicle 102 may be reduced in response to an increased temperature in the MCU 200 and/or the nozzle 122. For example, the MCU 200 may be programmed to have a first temperature threshold which may be a maximum operating temperature. If the first temperature threshold is exceeded, the MCU 200 may reduce the charging current delivered to the electric vehicle 102. If a reduction in the current flow to the electric vehicle 102 does not result in an associated decrease in the operational temperature of the nozzle 122, the MCU 200 may disconnect the electric vehicle 102 from the power supply 104 by opening the relay 206. Moreover, if opening the relay 206 does not result in an associated decrease in the operational temperature of the nozzle 122, the MCU 200 may activate an alarm. The alarm may be embodied as a visual and/or audible indicator.

The cable 110 also includes an insulation material (not shown) that enables the cable 110 to withstand severe operational conditions while maintaining high mechanical flexibility and durability. The cable 110 also includes a flexible cover or sheath (not shown) that is fabricated from, for example, a flexible thermoplastic elastomer (TPE) material that enables the cable 110 to withstand multiple flexes per day.

The nozzle 122 is configured to couple to the electric vehicle 102 and therefore provides an electrical pathway between the power supply 104 and the electric vehicle 102. In an exemplary embodiment, the nozzle 122 is configured to conform to the Society of Automotive Engineers (SAE) standard for electric vehicles. Accordingly, the nozzle 122 may be fabricated to conform to the SAE J1772 standard, for example. The nozzle 122 may be configured to conform to other standards, such as standards for other parts of the world, such as the IEC, in alternative embodiments.

In various embodiments, the smart plug 120 includes the MCU 200, a zero crossing detector (ZCD) 202, an over current device (OCD) 204, and the relay 206 that together function to enable the electric vehicle 102 to be charged via the power supply 104, both shown in FIG. 1. The term "microcontroller" may include any processor-based or microprocessor-based computer including systems using reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "microcontroller". The detailed explanation regarding the operation of the MCU 200, the ZCD 202, the OCD 204, and the relay 206 are explained in more detail below.

In general, the smart plug 120 may also include a protection device 210 for limiting the AC current and/or AC voltage supplied from the power supply 104 to the electric vehicle 102. The protection device 210 may include at least one fuse 212 that functions to limit the AC current supplied to the electric vehicle 102 when the AC current exceeds a maximum operational current for a period of time corresponding to the fault current. In various embodiments, the maximum operational current may be, for example, 16 A. Moreover, if the AC current exceeds, for example, 1 KA for 10 msec, the protection device 210 may activate to stop current from being supplied to the electric vehicle 102. The protection device 210 may also include a thermistor 214 having a negative temperature coefficient (NTC) such that the thermistor's impedance decreases proportionally to a rise in temperature. In operation, the thermistor 214 mitigates inrush current to the electric vehicle 102 by initially operating with a relatively high impedance which is gradually reduced to control the inrush current to the electric vehicle 102. The protection device 210 may further include an electrostatic discharge (ESD) circuit 216 to absorb the ESD energy by clamping the AC voltage at a relatively low voltage level, e.g. less than 15V.

The smart plug 120 also includes an isolated power supply 220 for providing power to the various operational components within the smart plug 120. In operation, the power supply 220 is configured to generate a primary power signal having a magnitude of, for example, +12V, −12V. The power supply 220 is also configured to generate a ground signal having a magnitude of, for example, −12V, +12V. In operation, the ground signal is generated in parallel with the primary power signal. The power supply 220 is further configured to generate a plurality of secondary power signals. The secondary power signals may include for example, a 3.3V signal supplied to the MCU 200 and a 10.0V signal supplied to an analog front end (AFE) 222 of the smart plug. The AFE 222 generally includes the various components that are located between the MCU 200 and the relay 206. The AFE 222 may also include the various components that are located between the MCU 200 and the communication lines 140.

The smart plug 120 also includes a current filter/gain device 230 that is configured to generate a current signal 232 that is suitable for use by the MCU 200, the ZCD 202, and the OCD 204. For example, as described above, the current carried by the power conductor 132 may approach 16 A. However, supplying a 16 A signal to the MCU 200, the ZCD 202, and the OCD 204 may result in damage to one or all of these components. In operation, the current filter/gain device 230 is therefore configured to sense the current in the power conductor 132 and output the current signal 232, having a current level that is usable by the MCU 200, the ZCD 202, and the OCD 204.

In various embodiments, the current filter/gain device 230 may include a current sense resistor (not shown) and/or a low noise drift amplifier (not shown) that also functions as a filter. More specifically, the current filter/gain device 230 may include a current sense resistor having a value of, for example, (1 mOhm) to reduce power dissipation. Optionally, the contact resistance of the relay may be used as a current sense resistor. The amplifier is selected such that an internal drift and noise in the amplifier is substantially less than a lowest voltage across the current sense resistor. Moreover, the amplifier has a gain that is selected such that the full operational range of the amplifier is between 0 A and 20 A RNS. As a result, the voltage across the current sense resistor is amplified and filtered to generate the current signal 232 that is input to the MCU 200.

The smart plug 120 also includes a voltage attenuator device 240 that is configured to generate a voltage signal 242 that is suitable for use by the MCU 200, the ZCD 202, and the OCD 204. For example, as described above, the voltage carried by the power conductor 132 may approach 110V/220V. However, supplying a 110V or 220V signal to the MCU 200, the ZCD 202, and the OCD 204 may result in damage to one or all of these components. In operation, the voltage attenuator device 240 is therefore configured to sense the voltage in the power conductor 132 and output the voltage signal 242 that is scaled down in voltage from the voltage level in the power conductor 132 and is also capacitively isolated and level-shifted. The voltage attenuator device 240 may measure voltage differences between the line 132 and neutral 134 and/or between the ground 136 and neutral 134 and/or between the ground 136 and line 132. The relay 206 may be operated based on input from the voltage attenuator device 240. The voltage attenuator device 240 may measure voltage differences upstream and/or downstream of the relay 206.

The relay 206 is configured to operate in a closed state or an open state. In various embodiments, the relay 206 includes an electronic latch circuit 260, one or more coil drivers 262 and relay contacts 264. In the illustrated embodiment, relay contacts 264 are associated each of the neutral, line and ground, however in other embodiments, relay contacts 264 may only be included for the line and neutral. In the closed state, the contacts 264 are closed to enable power to be supplied from the power supply 104 to the electric vehicle 102. More specifically, the latch circuit 260 outputs a signal that energizes the coil driver(s) 262 causing the contacts 264 to close. Optionally, two coil drivers 262 are provided, including one coil driver 262 to drive the contacts 264 associated with the line and the neutral and the other coil driver 262 to drive the contact 264 associated with the ground. Having multiple coil drivers allows the contacts 264 to be driven independently. In other alternative embodiments, three coil drivers 262 may be provided one each for the line, neutral and ground. Alternatively, a single coil driver 262 may drive the line, neutral and ground. Moreover, the relay 206 is also configured to operate in an open state, e.g. the contacts 264 are opened to prohibit power from being supplied to the electric vehicle 102. More specifically, when the signal output from the latch circuit 260 is disabled or stopped, the coil driver(s) 262 are de-energized causing the contacts 264 to open.

In operation, the relay 206 utilizes two signals to initiate a switching operation between the open state and the closed state, or between the closed state and the open state. The two signals include the relay control signal 148 provided by the MCU 200 and a ZCD output signal 250 provided by the ZCD 202.

In one embodiment, the relay control signal 148 may be generated based on a manual input from the operator. For example, when the operator desires to operate the relay 206 in the closed state, the operator may depress a button, or otherwise provide an indication to the MCU 200 to generate the relay control signal 148. The relay control signal 148 is then transmitted to the relay 206 to initiate a closure of the contacts 264. In another embodiment, the relay control signal 148 is automatically generated by the MCU 200 as described above. For example, the relay control signal 148 may be generated when the proximity detector signal 144 indicates that the electric vehicle 102 is connected to the power supply 104 and the pilot signal 142 is received at the MCU 200.

However, as described above, the contacts 264 in the relay 206 do not close or open unless two signals are received, e.g. the relay control signal 148 and the ZCD output signal 250 provided by the ZCD 202. Thus, although the MCU 200 may transmit the relay control signal 148 to the relay 206 to initiate opening or closing the contacts 264, the relay 206 does not physically open or close the contacts 264 until the ZCD output signal 250 is received from the ZCD 202.

Figure 3:
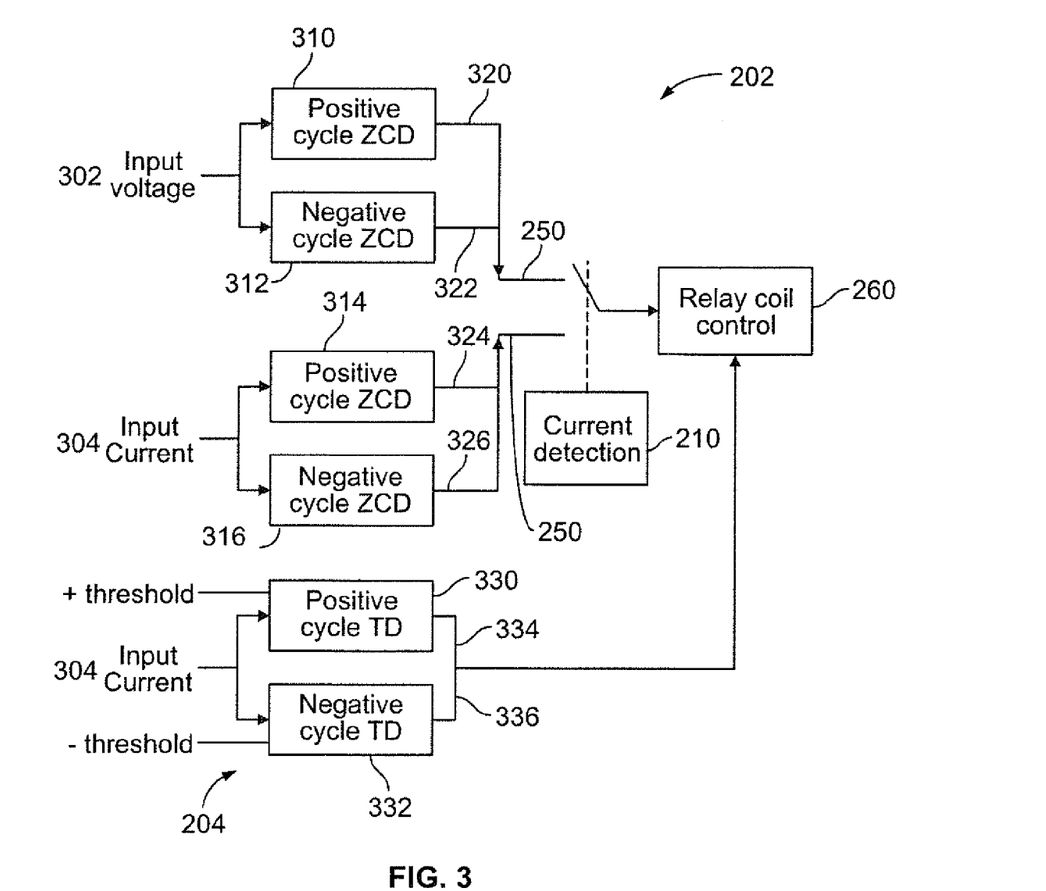
FIG. 3 is a schematic illustration of a zero crossing detector (ZCD) formed in accordance with an exemplary embodiment of the smart plug.
Figure 4:
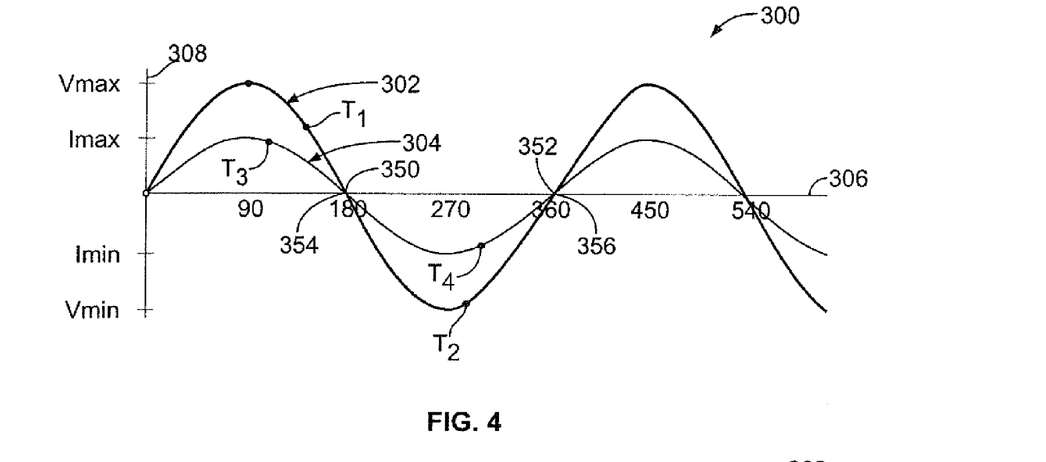
FIG. 4 is a voltage waveform and a current waveform generated in accordance with an exemplary embodiment for use with the zero crossing detector.

FIG. 3 is a schematic illustration of an exemplary embodiment of the ZCD 202 that may be utilized to generate the ZCD output signal 250. FIG. 4 is a graphical image 300 of an exemplary voltage waveform 302 and an exemplary current waveform 304 that may be input to the ZCD 202 and utilized by the ZCD 202 to generate the ZCD output signal 250. As shown in FIG. 4, an x-axis 306 represents the angle of the voltage and current waveforms 302 and 304 and a y-axis 308 represents the amplitude of the voltage and current waveforms 302 and 304. Accordingly, it should be realized that when the voltage waveform 302 intersects the X-axis 306, referred to herein as the crossing point 350, 352, the amplitude of the voltage waveform 302 is zero. Moreover, it should be realized that when the current waveform 304 intersects the X-axis 306 354, 356 the amplitude of the current waveform 304 is zero.

In operation, the ZCD 202 senses both the current and the voltage using the voltage waveform 302 and the current waveform 304 and detects the zero crossing points 350, 352, 354, 356 in the voltage waveform 302 and the current waveform 304 to generate the ZCD output signal 250 as described in more detail below.

In various embodiments, the ZCD 202 includes a positive voltage ZCD 310, a negative voltage ZCD 312, a positive current ZCD 314, and a negative current ZCD 316. The positive voltage ZCD 310 or positive current ZCD 314 may be referred to as positive cycles and the negative voltage ZCD 312 or negative current ZCD 316 may be referred to as negative cycles. Each of the ZCD 310, ZCD 312, ZCD 314, and ZCD 316 functions as a comparator having a reference level set at zero and may be implemented, using for example, operational amplifiers. In operation, the ZCDs 310 and 312 are used in conjunction with the relay control signal 148 to close the relay contacts 264. Moreover, the ZCDs 314 and 316 are used in conjunction with the relay control signal 148 to open the relay contacts 264. For example, when the amplitude of the voltage waveform 302 is positive and the relay control signal 148 has been received at the relay 206 to close the contacts 264, the ZCD 310 detects the zero crossing of the voltage waveform 302 and outputs a relay close signal 320 that in combination with the relay control signal 148 causes the relay contacts 264 to close. When the amplitude of the voltage waveform 302 is negative and the relay control signal 148 has been received at the relay 206, the ZCD 312 detects the zero crossing of the voltage waveform 302 and outputs a relay close signal 322 that in combination with the relay control signal 148 causes the relay contacts 264 to close. Thus, the ZCD 310 and ZCD 312 operate to generate a signal, 320 or 322 respectively, to close the contacts 264 when the MCU 200 outputs the relay control signal 148 to close the contacts 264.

Moreover, when the amplitude of the current waveform 304 is positive and the relay control signal 148 has been received at the relay 206 to open the contacts 264, the ZCD 314 detects the zero crossing of the current waveform 304 and outputs a relay open signal 324 that in combination with the relay control signal 148 causes the relay contacts 264 to open. When the amplitude of the current waveform 304 is negative and the ZCD 316 detects a zero crossing, the ZCD 316 outputs a relay open signal 326 that in combination with the relay control signal 148 causes the relay contacts 264 to open. Thus, the ZCD 314 and ZCD 316 operate to generate a signal, 324 and 326, respectively, to open the contacts 264 when the MCU 200 outputs a signal to open the contacts 264. Accordingly, it should be realized that any of the signals 320, 322, 324, and/or 326 may represent the ZCD output signal 250 that is input to the relay 206 and used in conjunction with the relay control signal 148 to open and/or close the relay contacts 264.

The operation of the ZCD 202 is explained in more detail referring to FIG. 4. As described above, the relay contacts 264 are closed based on the voltage waveform 302 which is monitored using the ZCDs 310 and 312 and the relay contacts 264 are opened based on the current waveform 304 which is monitored using the ZCDs 314 and 316. Accordingly, assume that at time T1 an operator couples the nozzle 122 to the electric vehicle 102. As described above, coupling the nozzle 122 to the electric vehicle 102 activates the proximity detection signal 144 and/or the pilot signal 142 which is then transmitted to the MCU 200. In response, the MCU 200 outputs the relay control signal 148 to the relay 206 at the time T1. In this example, because the MCU 200 is instructing the relay contacts 264 to close and T1 occurs when the voltage waveform 302 is positive, the ZCD 310 is utilized to detect when the voltage waveform 302 is approximately zero volts, referred to herein as the zero crossing point labeled 350. When the ZCD 310 detects the zero crossing point 350, the ZCD 310 outputs the signal 320 to the relay 206. In response to the signal 320 and the relay control signal 148 being received by the relay 206, the relay contacts 264 are closed.

As another example, assume that the operator couples the nozzle 122 to the electric vehicle 102 to initiate charging the electric vehicle 102 at a time T2. In this example, because the MCU 200 is instructing the relay contacts 264 to close and T2 occurs when the voltage waveform 302 is negative, the ZCD 312 is utilized to detect when the voltage waveform 302 passes the zero crossing point 352. Once the ZCD 312 detects the zero crossing point 352, the ZCD 312 outputs the signal 322 to the relay 206. In response to the signal 322 and the relay control signal 148 being received by the relay 206, the relay contacts 264 are closed.

Moreover, assume that the operator uncouples the nozzle 122 from the electric vehicle 102 to conclude the charging of the electric vehicle 102 at a time T3. As described above, uncoupling the nozzle 102 from the electric vehicle 102 deactivates the proximity detection signal 144. In response, the MCU 200 outputs the relay control signal 148 to the relay 206 at the time T3. In this example, because the MCU 200 is instructing the relay contacts 264 to open and T3 occurs when the current waveform 304 is positive, the ZCD 314 is utilized to detect when the waveform 304 is approximately zero amps, referred to herein as the zero crossing point labeled 354. When the ZCD 314 detects the zero crossing point 354, the ZCD 314 outputs the signal 324 to the relay 206. In response, to the signal 324 and the relay control signal 148 being received by the relay 206, the relay contacts 264 are opened.

Additionally, assume that the operator uncouples the nozzle 122 from the electric vehicle at a time T4. In this example, because the MCU 200 is instructing the relay contacts 264 to open the contacts 264 and T4 occurs when the current waveform 304 is negative, the ZCD 316 is utilized to detect when the waveform 304 passes a zero crossing point 356. Once the ZCD 316 detects the zero crossing point 356, the ZCD 316 outputs the signal 326 to the relay 206. In response to the signal 326 and the relay control signal 148 being received by the relay 206, the contacts 264 are opened.

Referring again to FIG. 3, as described above, the EVSE system 100 also includes the OCD 204. In operation, the OCD 204 is configured to substantially instantaneously trip or open the relay contacts 264 when a current overload condition is detected. More specifically, the OCD 204 includes a positive cycle threshold detector 330 and a negative cycle threshold detector 332. In operation, the positive cycle threshold detector 330 determines/monitors the positive cycle of the current waveform 304. When the positive cycle threshold detector 330 determines that an current overload condition exists, the positive cycle threshold detector 330 outputs a signal 334 to the relay contacts 264 causing the relay contacts 264 to open. Moreover, when the negative cycle threshold detector 332 determines that a current overload condition exists, the negative cycle threshold detector 332 outputs a signal 336 to the relay contacts 264 causing the relay contacts 264 to open.

Thus, in operation, the ZCD 202 functions to switch the relay 206 at a time that is selected to reduce destructive current and/or voltage transients through the contacts 264. For example, when switching the relay 206 to the ON state, wherein the contacts 264 are closed, the switching is timed such that the contacts 264 close at approximately zero voltage, i.e. zero cross of the voltage waveform 302. Additionally, when the relay 206 is switched to the OFF state, the relay contacts 264 are opened at approximately the zero cross of the current waveform 304. Additionally, when a very high current transient (>100 A) occurs, the OCD 204 substantially instantaneously switches the relay 206 to the OFF state such that the relay switching time is minimized.

Figure 5:
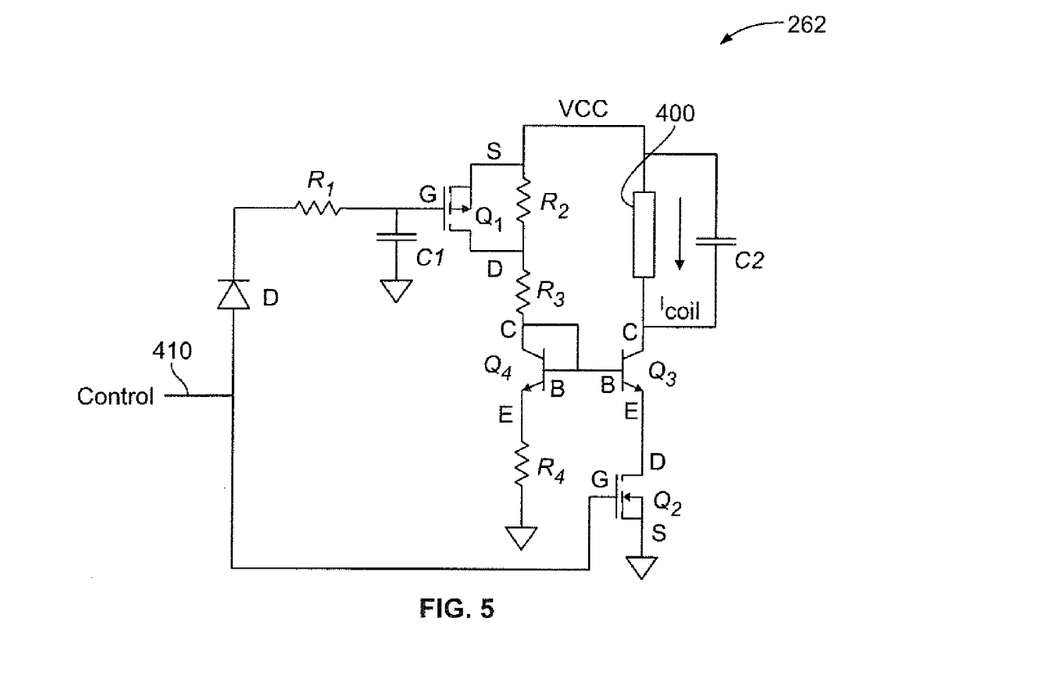
FIG. 5 is a schematic illustration of a coil driver formed in accordance with and exemplary embodiment.

FIG. 5 is a schematic diagram of the coil driver 262 shown in FIG. 2. The coil driver 262 includes a switch Q1 and a switch Q2. In various embodiments, the switch Q1 may be implemented using a P-channel metal-oxide-semiconductor field-effect transistor (MOSFET) and the switch Q2 may be implemented using an N-channel MOSFET. The coil driver 262 also includes a switch Q3 and a switch Q4. In various embodiments, the switches Q3 and Q4 may each be implemented using an NPN bi-polar junction transistor (BJT). The coil driver 262 further includes a diode D, a resistor R1 that is coupled to the gate (G) of Q1, a resistor R2 that is coupled across Q1, a resistor R3 that is coupled between the drain (D) of Q1 and the collector (C) of Q4, and a resistor R4 that is coupled to the emitter (E) of Q4. The coil driver 262 further includes a capacitor C1 that is coupled to the gate of Q1, a coil 400 having an armature (not shown) therein, and a capacitor C2 that is coupled across the coil 400. In various embodiments, the coil driver 262 functions as a current mirror. A current mirror is a circuit that is configured to copy a current through one active device, such as Q3 by controlling the current in another active device such as Q4.

In operation, the coil driver 262 is operated to open and close the coil 400, causing the relay contacts 264 to open and close. Q3 operates as the driver of the coil 400 and is controlled using the current mirror between Q3 and Q4. The coil driver 262 initially has high current flowing through the circuit to pull the armature closed. The current of the coil driver 262 is later reduced for low power consumption. The current is controlled independent of the resistance of the coil 400 by using the current mirror. As such, temperature effects on the resistance of the coil 400 do not affect other aspects of the system, such as the zero fault detection operation. The current mirror operates at a high current to initially close the contacts 264. The current mirror operates at a lower current to maintain the contacts 264 in a closed state. The current mirror ensures that the current value does not change with temperature or relay-to-relay variation, which may control the closing time of the relays.

In operation, a control signal 410 is input to the switches Q1 and Q2. The control signal 410 is also input to the switch Q3. Thus, the control signal 410 is used to turn on the switches Q1 and Q3. In various embodiments, the control signal 410 is received from the latch circuit 260. The control signal 410 is input to the switch Q1 via the diode D. Initial activation of the switch Q1 causes a short circuit across R2. The backside of the current path thus initially flows through R3, Q4 and R4 and does not flow through R2. The current path thus initially has a high current, which is reflected across the current mirror, at some ratio, in Q3 to drive the contacts 264 to close. After the contacts 264 are closed, Q1 is deactivated and R2 forms part of the path, i.e. the resistance is now R2+R3. Additionally, the current in the mirror branch is reduced and therefore the current through the coil 400 is also reduced to a level that is sufficient to maintain the contacts 264 in the closed position. When the control signal 410 goes from a 1 to 0, Q2 is deactivated stopping the current through the coil 400, causing the relay contacts 264 to open.

As the current Icoil flows through the coil 400, the coil 400 generates a magnetic field which pulls the armature within the coil 400 to either close or open the relay contacts 264. When the relay contacts 264 are required to open, via an overcurrent condition for example, it is desirable to quickly reduce the current in the coil 400 and thus quickly break the relay contacts 264. The capacitor C2 functions to control the decay of the coil current such that it strikes balance between speed of decay and kickback voltage.

It should therefore be realized that in operation, the relay 206 consumes power. When the relay 206 is operated to initiate closing the contacts 264, the relay 206 may requires a substantially quantity of current to pull the armature to mate the contacts 264. However, once the contacts 264 are closed, the current through the coil 400 may be reduced. Thus, the relay 206 operates at two voltages, referred to herein as a make voltage utilized to close the contacts 264 and a let voltage utilized to maintain the contacts 264 in the closed position. Accordingly, because the let voltage is smaller then the make voltage, the current through the coil 400 is also less than the current through the coil 400 required to initially close the contacts 264. Accordingly, when a fault is detected, the contacts 264 may be opened more quickly because the delay is a function of the coil current which is reduced.

In operation Q2 enables the current Icoil to flow through the coil 400. However, when Q2 is deactivated, the current Icoil goes to zero which may result in a significant increase in the voltage across the coil 400. Accordingly, C2 is used to create a local resonance around the coil 400, to facilitate controlling the speed of the current Icoil decaying within the coil 400. Accordingly, C2 is selected to provide a balance between the current decay speed and the voltage across the coil 400.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A smart plug for coupling an electric vehicle to a power supply, said smart plug comprising:
   a relay including contacts, the relay configured to operate in a closed state to enable power to be supplied to the electric vehicle and an open state to prohibit power from being supplied to the electric vehicle, the contacts being in a closed position when the relay is in the closed state and in an open position when the relay is in the open state, wherein the relay includes a coil that is configured to move the contacts between the closed and open positions and a current mirror having first and second paths, the first path having a first current that controls a second current of the second path, the second current flowing through the coil at a designated ratio of the first current, wherein the first path includes a first switch that controls a level of the first current through the first path and the second path includes a second switch that controls a flow of the second current through the second path;
   a microcontroller (MCU) coupled to the relay, the MCU outputting a relay control signal to the relay to move the contacts; and
   a zero crossing detector (ZCD) coupled to the relay, the ZCD outputting a close signal when a voltage of the power is substantially zero and outputting an open signal when a current of the power is substantially zero, wherein the first and second switches are configured to receive a common switch control signal that controls operation of the first and second switches, respectively, the common switch control signal being based on the relay control signal, wherein:
   (a) after receiving the relay control signal to move the contacts from an open position to a closed position, the relay delays activating the first and second switches to close the contacts until the voltage of the power is substantially zero based on the close signal, wherein the relay controls the first current such that the second current causes the coil to initially move the contacts to the closed positions, wherein, after the contacts are in the closed positions, the first switch is activated to decrease the first current thereby decreasing the second current through the coil to a reduced level that is sufficient to maintain the contacts in the closed position; and
   (b) after receiving the relay control signal to move the contacts from a closed position to an open position, the relay delays activating the second switch to open the contacts until the current of the power is substantially zero based on the open signal.

2. A smart plug in accordance with claim 1, wherein the ZCD comprises a positive voltage ZCD and a negative voltage ZCD configured to output the close signal.

3. A smart plug in accordance with claim 1, wherein the ZCD comprises a positive current ZCD and a negative current ZCD configured to output the open signal.

4. A smart plug in accordance with claim 1, wherein the ZCD comprises:
   a positive voltage ZCD configured to output the close signal when a voltage waveform is positive; and
   a negative voltage ZCD configured to output the close signal when the voltage waveform is negative.

5. A smart plug in accordance with claim 4, wherein the ZCD comprises:
   a positive current ZCD configured to output the open signal when a current waveform is positive; and
   a negative current ZCD configured to output the open signal when the current waveform is negative.

6. A smart plug in accordance with claim 1, further comprising a voltage attenuator configured to reduce an operational voltage to the ZCD.

7. A smart plug in accordance with claim 1, further comprising:
   an over current device (OCD), the OCD configured to detect a current overload condition and output an OCD signal that activates the second switch to move the contacts to the open positions, the second current having the reduced level when the contacts are opened.

8. A relay control circuit for making or breaking contacts, said relay control circuit comprising:
   a relay configured to receive signals from a zero crossing detector (ZCD) and a microcontroller unit (MCU), the relay including:
      contacts configured to operate in a closed state to enable power to be supplied to an electric vehicle and an open state to prohibit power from being supplied to the electric vehicle, the contacts being in a closed position when in the closed state and in an open position when in the open state; and
      a coil driver coupled to the contacts, the coil driver including a coil that is configured to move the contacts between the closed and open positions and a current mirror having first and second paths, the first path having a first current that controls a second current of the second path, the second current flowing through the coil at a designated ratio of the first current, wherein the first path includes a first switch that controls a level of the first current through the first path and the second path includes a second switch that controls a flow of the second current through the second path, the ZCD outputting a close signal when a voltage of a power signal is substantially zero and outputting an open signal when a current of the power is substantially zero, and wherein the first and second switches are configured to receive a common switch control signal that controls operation of the first and second switches, respectively, the common switch control signal being based on a relay control signal from the MCU, wherein:
         (a) after receiving the relay control signal to move the contacts from an open position to a closed position, the relay controls the the first and second switches to close the contacts when the voltage of the power is substantially zero based on the close signal, wherein the coil driver controls the first current such that the second current causes the coil to initially move the contacts to the closed positions, wherein, after the contacts are in the closed positions, the first switch is activated to decrease the first current thereby decreasing the second current through the coil to a reduced level that is sufficient to maintain the contacts in the closed position; and
         (b) after receiving the relay control signal to move the contacts from a closed position to an open position, the relay controls the second switch to open the contacts when the current of the power is substantially zero based on the open signal.

9. The relay control circuit of claim 8, wherein the ZCD comprises:
a positive voltage ZCD configured to output the close signal when a voltage of the power is positive; and
a negative voltage ZCD configured to output the close signal when the voltage of the power is negative.

10. The relay control circuit of claim 8, wherein the ZCD comprises:
a positive current ZCD configured to output the open signal when a current of the power is positive; and
a negative current ZCD configured to output the open signal when the current of the power is negative.

11. An electric vehicle support equipment (EVSE) system comprising:
a nozzle configured to couple to an electric vehicle;
a smart plug; and
a cable coupled between the nozzle and the smart plug, the smart plug comprising:
a relay including contacts, the relay configured to operate in a closed state to enable power to be supplied to the electric vehicle and an open state to prohibit power from being supplied to the electric vehicle, the contacts being in a closed position when the relay is in the closed state and in an open position when the relay is in the open state, wherein the relay includes a coil that is configured to move the contacts between the closed and open positions and a current mirror having first and second paths, the first path having a first current that controls a second current of the second path, the second current flowing through the coil at a designated ratio of the first current, wherein the first path includes a first switch that controls a level of the first current through the first path and the second path includes a second switch that controls a flow of the second current through the second path;
a microcontroller (MCU) coupled to the relay, the MCU outputting a relay control signal to the relay to move the contacts; and
a zero crossing detector (ZCD) coupled to the relay, the ZCD outputting a close signal when a voltage of the power is substantially zero and outputting an open signal when a current of the power is substantially zero, wherein the first and second switches are configured to receive a common switch control signal that controls operation of the first and second switches, respectively, the common switch control signal being based on the relay control signal, wherein:

(a) after receiving the relay control signal to move the contacts from an open position to a closed position, the relay delays activating the first and second switches to close the contacts until the voltage of the power is substantially zero based on the close signal, wherein the relay controls the first current such that the second current causes the coil to initially move the contacts to the closed positions, wherein, after the contacts are in the closed positions, the first switch is activated to decrease the first current thereby decreasing the second current through the coil to a reduced level that is sufficient to maintain the contacts in the closed position; and (b) after receiving the relay control signal to move the contacts from a closed position to an open position, the relay delays activating the second switch to open the contacts until the current of the power is substantially zero based on the open signal.

12. The EVSE system of claim 11, wherein the smart plug further comprises a voltage attenuator configured to reduce an operational voltage to the ZCD.

13. The smart plug of claim 1, wherein the smart plug includes a plug housing that encloses the relay, the MCU, and the ZCD.

14. The smart plug of claim 1, wherein the relay control signal to move the contacts is generated in response to a proximity detector signal and a pilot signal being received at the MCU, the proximity detector signal indicating whether the electric vehicle is connected to the power supply and the pilot signal indicating whether the electric vehicle is ready for charging.

15. The smart plug of claim 1, wherein the first and second paths have a common voltage source.

16. The smart plug of claim 1, wherein the first path has a first resistance when the first switch has a first state and a second resistance when the first switch has a second state, the second resistance causing the first current to decrease.

17. The smart plug of claim 1, wherein the relay includes a resistor that is in parallel with the first switch such that the first current flows through the resistor when the first switch has a second state and the first current is short circuited around the resistor when the first switch has a first state.

18. The smart plug of claim 1, wherein the relay includes a capacitor that is coupled across the coil and is configured to control a decay of the current through the coil.

* * * * *